B. THOENS.
BALANCED VALVE.
APPLICATION FILED JAN. 14, 1919.
1,320,944.
Patented Nov. 4, 1919.
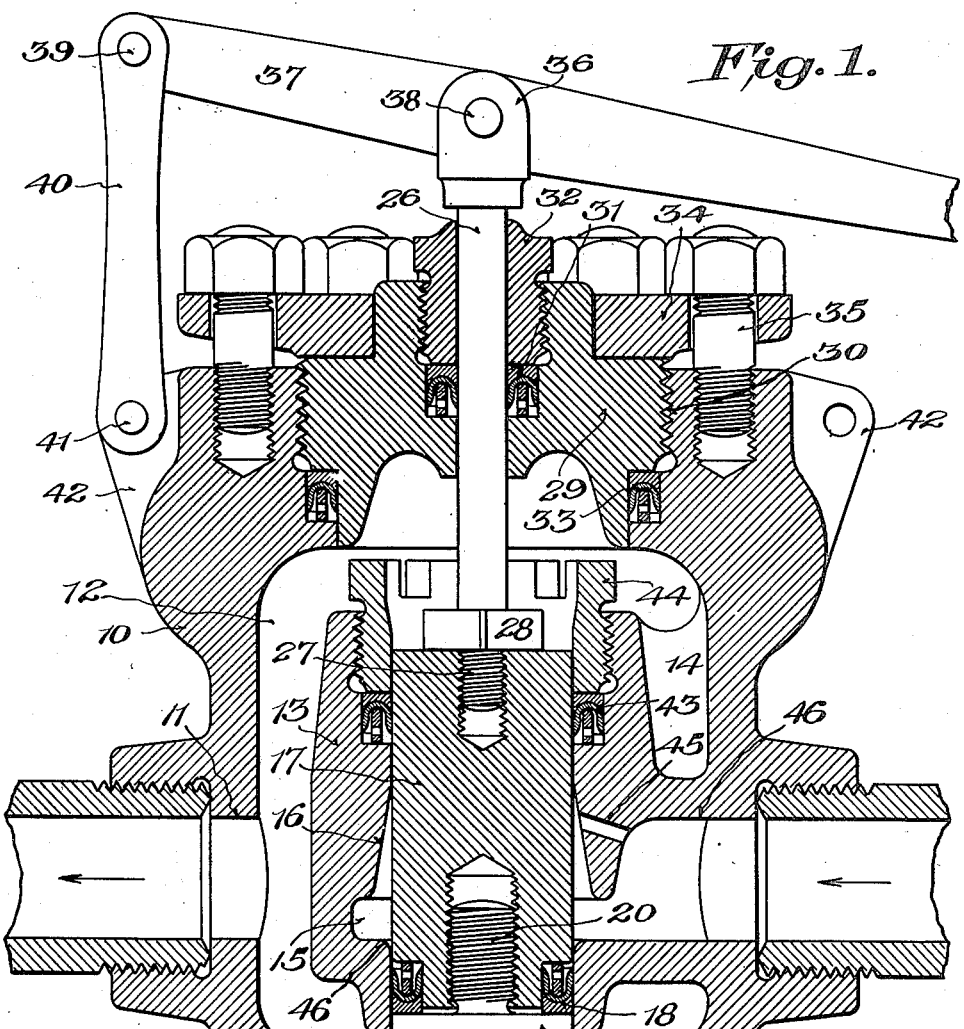
Fig. 1.
Fig. 2.
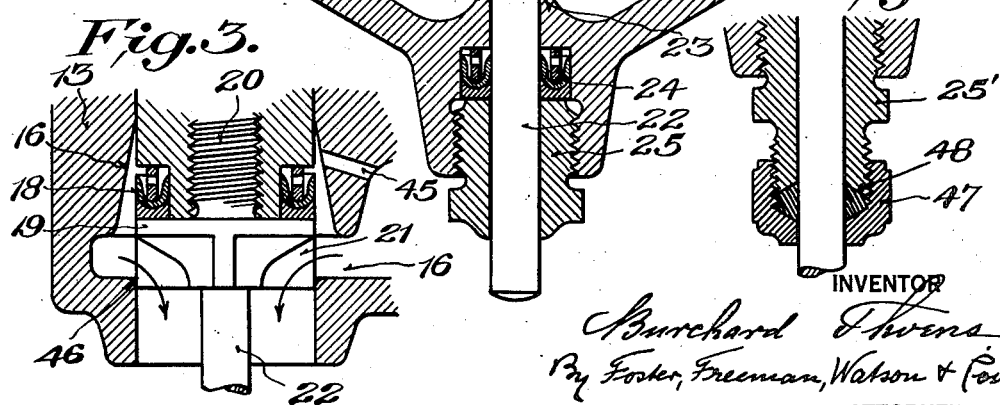
Fig. 3.
INVENTOR
Burchard Thoens
By Foster, Freeman, Watson & Coit,
ATTORNEYS.

UNITED STATES PATENT OFFICE.

BURCHARD THOENS, OF NEW YORK, N. Y.

BALANCED VALVE.

1,320,944.  Specification of Letters Patent.  Patented Nov. 4, 1919.

Application filed January 14, 1919. Serial No. 271,133.

*To all whom it may concern:*

Be it known that I, BURCHARD THOENS, a citizen of the United States, and residing at New York, New York county, New York State, have invented certain new and useful Improvements in Balanced Valves, of which the following is a specification.

The present invention relates to valves and more particularly to balanced valves adapted for high pressures.

The principal features of the invention reside in the construction and arrangement of parts whereby a valve is provided which is truly balanced, non-leaking, may be opened and closed rapidly, and has no seats subject to corrosion or cutting action due to the flow of the fluids.

Other features of novelty and objects of the invention will be apparent from the description taken in connection with the drawings in which:

Figure 1 is a sectional elevation through a valve constructed in accordance with the present invention;

Fig. 2 is a sectional elevation of a detail showing a modification; and

Fig. 3 is a sectional elevation of part of the valve showing the same in open position.

Referring to the drawings which illustrate the at present preferred embodiment of the invention, the numeral 10 indicates a hollow valve body formed with a port 11 through its side wall, which may act as the outlet. Disposed within the interior chamber 12 of the body is an open-ended hollow cylinder 13, supported in spaced relation to the interior surfaces of the chamber 12 by one or more webs such as indicated at 14. Intermediate its ends the interior of the cylinder is formed with an annular groove 15 which communicates with an inlet conduit or port 16. A portion of the interior surface of the cylinder extending from the groove 15 upwardly for a short distance is formed conical, as indicated at 16.

A piston or plunger 17 is fitted to slide within the cylinder 13 and at its lower end is provided with a packing 18 which is held in position by a disk or washer 19 having a stem 20 screwed into the piston. The valve as shown in Fig. 1 is in closed position, it being noted that the piston obstructs the passage of fluid from the port 16 to the chamber 12 in the valve body. Further, it will be observed that the washer 19 acts to prevent displacement of the packing 18 due to any pressure to which it may be subjected from a fluid in the port 16 and annular groove 15. The washer 19 is reinforced by the webs 21 and carries a downwardly extending stem 22 which is slidingly mounted in the lower wall of the valve body. In its closed position it will be noted that the lower edges of the webs 21 rest on the abutment 23 thereby relieving the threads of the stem 20 from pressure acting on the packing 18. Leakage along the stem 22 is prevented by a stuffing box comprising the packing 24 and gland 25.

For the purpose of actuating the piston 17 the stem 26 is provided and has its lower end threaded into the piston as at 27, a nut portion 28 being provided to afford means for screwing up the stem. As shown the upper part of the valve is formed with an aperture of sufficient diameter so that the parts within the chamber 12 may be removed therethrough. This opening is closed by a plug 29 threaded to the body as at 30 and through which the stem 26 extends. Leakage of fluid along the stem is prevented by a stuffing box comprising the packing 31 and gland 32. Leakage around the plug 29 is eliminated by the annular packing 33 which is held tight by the plug 29 being screwed against the same. In order to prevent the plug 29 having its threads stripped due to the high pressure within the valve, a ring 34 rests on the top of the plug and is secured to the valve body by a plurality of studs 35. For the purpose of actuating the stem 26, its upper end is bifurcated as at 36 and has a lever 37 pivoted on the pin 38, the lever lying between the bifurcations 36. One end of said lever is pivoted as at 39 to a link 40, the lower end of which, in turn, is pivoted as at 41 to the valve body. A plurality of ears 42 for supporting the pin 41 is provided spaced around the valve body so that the lever mechanism may be disposed in the most convenient position for the operator.

For the purpose of preventing leakage of fluid upward along the piston 17, the cylinder 13 carries a packing 43 which is held tight by a gland 44. The opening which the plug 29 closes is formed of a diameter so that the gland 44 may be withdrawn therethrough.

In the operation of the valve to open the same, the lever 37 is actuated to raise the stem 26 thereby sliding the piston 17 to the position shown in Fig. 3. Thereupon fluid flows from the inlet down through the cylinder to the chamber 12 of the valve body and thence outward through the outlet 11. When the piston is thus moved upwardly, the packing 18 being opposite the conical surfaces 16, may expand. In order to afford a vent for the space above this packing, a duct 45 is provided which connects the inlet passage 16 and the annular conical space between the surface 16 and the piston 17. As the stems 22 and 26 are of the same diameter it will be observed that the total pressures acting on each end of the piston 17 are equal for all positions of said piston. Consequently, it is always balanced and may be easily moved up or down. To close the valve, of course, the piston 17 is moved downward from the position shown in Fig. 3, the edges 46 being slightly rounded so as to guide the packing 18.

For extremely high pressures, in order to further prevent leakage along the stem 22, the gland 25 may be formed as illustrated at 25' in Fig. 2, and a cap 47 screwed on its lower end to hold the second packing 48 in place.

Although an embodiment of the invention has been described in detail it is to be understood that the invention is not thus limited but includes changes and modifications which come within the scope of the appended claims.

Having thus described the invention what is claimed as new and desired to be secured by Letters Patent is:—

1. A high pressure balanced valve comprising, in combination, a hollow valve body having an outlet, a hollow open ended cylinder within the body spaced from the interior surface thereof, an inlet conduit extending through the wall of the body and communicating with the interior of said cylinder, a piston fitted to said cylinder with its cylindrical surface normally closing said inlet conduit and slidable to carry one end by said conduit to open the valve, and means to actuate said piston from the outside of said body.

2. A high pressure balanced valve comprising, in combination, a hollow valve body having an outlet, a hollow open ended cylinder within the body spaced from the interior surface thereof, an inlet conduit extending through the wall of the body and communicating with the interior of said cylinder, a piston fitted to said cylinder and slidable to carry one end by said conduit, a stem projecting from said end of the piston and slidable in the valve body, and an actuating stem secured to the other end and projecting through the valve body, said stems being of the same diameter.

3. A high pressure balanced valve comprising, in combination, a hollow valve body having an outlet, a hollow open ended cylinder within the body spaced from the interior surface thereof, an inlet conduit extending through the wall of the body and communicating with the interior of said cylinder, a piston fitted to said cylinder and slidable to carry one end by said conduit, packing carried by the piston at said end, a disk secured to the piston to retain said packing adapted to rest against the valve body when the piston is at one end of its movement, and means to actuate said piston.

4. A high pressure balanced valve comprising, in combination, a hollow valve body having an outlet, a hollow open ended cylinder within the body spaced from the interior surface thereof, an inlet conduit extending through the wall of the body and communicating with the interior of said cylinder, a piston fitted to said cylinder and slidable to carry one end by said conduit, packing carried by the piston at said end, a disk secured to the piston to retain said packing adapted to rest against the valve body when the piston is at one end of its movement, a stem secured to the said end of the piston slidably in the body, and an actuating stem projecting from the opposite end through the wall of the valve body, said stems being of the same diameter.

5. A high pressure balanced valve comprising, in combination, a hollow valve body having an outlet, a hollow open ended cylinder within the body spaced from the interior surface thereof, an inlet conduit extending through the wall of the body and communicating with the interior of said cylinder, a piston fitted to said cylinder and slidable to carry one end by said conduit, packing carried by the piston at said end, a disk secured to the piston to retain said packing adapted to rest against the valve body when the piston is at one end of its movement, a stem projecting from said disk slidable in the valve body, and an actuating stem projecting from the opposite end of the piston through the valve body, said stems being of the same diameter.

6. A high pressure balanced valve comprising, in combination, a hollow valve body having an outlet, a hollow open ended cylinder supported within the body and spaced therefrom, the interior of said cylinder formed with an annular groove, an inlet conduit extending through the valve body communicating with said groove, a piston fitted in said cylinder, means to slide the piston to carry one end by the said groove including an actuating stem projecting from one end of the piston through the wall of the valve body; packing at the other end of the piston, and a stem having means to retain said packing projecting from the latter end and slidable in the valve body, said stems being of the same diameter.

7. A high pressure balanced valve, comprising in combination, a hollow valve body having a passage through its wall, a hollow open ended cylinder within the body provided with a port establishing communication between the interior of the cylinder and outside the body, a piston slidable in said cylinder to bring one end by said port, packing at said end, the interior of the cylinder having an annular groove communicating with said port, and a conical surface extending from the groove away from the said end of the piston, a relief passage between said port and the space formed between the piston and said conical surface, and means to actuate said piston.

In testimony whereof I affix my signature.

BURCHARD THOENS.